United States Patent [19]

Takahashi et al.

[11] Patent Number: 5,121,381
[45] Date of Patent: Jun. 9, 1992

[54] OPTICAL SWITCHING APPARATUS FOR DIGITAL SIGNAL CROSS CONNECTION AND METHOD OF INTERSWITCH OPTICAL TRANSMISSION OF DIGITAL SIGNALS

[75] Inventors: Yasushi Takahashi, Hachioji; Yoshitaka Takasaki, Tokorozawa, both of Japan

[73] Assignee: Hitachi, Ltd., Tokyo, Japan

[21] Appl. No.: 397,553

[22] Filed: Aug. 23, 1989

[30] Foreign Application Priority Data

Sep. 2, 1988 [JP] Japan ................................ 63-218305

[51] Int. Cl.$^5$ ............................................. H04J 14/00
[52] U.S. Cl. ..................... 359/117; 359/135; 359/124
[58] Field of Search ................ 370/1, 3, 4, 50, 70; 455/600, 612

[56] References Cited

U.S. PATENT DOCUMENTS

| | | | |
|---|---|---|---|
| 4,468,765 | 8/1984 | Hensel et al. | 370/1 |
| 4,704,715 | 11/1987 | Shibagaki | 370/3 |
| 4,821,255 | 4/1989 | Kobrinski | 370/3 |
| 4,831,616 | 5/1989 | Huber | 370/3 |
| 4,834,483 | 5/1989 | Arthurs | 370/1 |
| 4,845,703 | 7/1989 | Suzuki | 370/1 |

FOREIGN PATENT DOCUMENTS

| | | | |
|---|---|---|---|
| 0059227 | 3/1988 | Japan | 370/1 |
| 0209396 | 8/1988 | Japan | 370/4 |
| 0011494 | 1/1989 | Japan | 370/4 |
| 0013900 | 1/1989 | Japan | 370/3 |
| 0068094 | 3/1989 | Japan | 370/4 |

OTHER PUBLICATIONS

Arthurs, "Highpass: An Optoelectronic Hybrid Packet Switching System" IEEE Journal on Selected Areas in Communications vol. 6 #9, Dec. 1988, pp. 1500–1510.

Primary Examiner—Reinhard J. Eisenzopf
Assistant Examiner—L. Van Beek
Attorney, Agent, or Firm—Pennie & Edmonds

[57] ABSTRACT

Disclosed is an optical switching apparatus comprising means for converting serial optical or electrical signals into parallel signals in a time division mode, first and second time division switch groups and a space division switch group for cross connecting the signal of the optical or electrical signals, and means for generating the edited optical or electrical signals as serial signals again.

22 Claims, 5 Drawing Sheets

OPTICAL SWITCHING APPARATUS FOR DIGITAL SIGNAL CROSS CONNECTION AND METHOD OF INTERSWITCH OPTICAL TRANSMISSION OF DIGITAL SIGNALS

BACKGROUND OF THE INVENTION

This invention relates to Cross Connection and switching of digital signals, and more particularly to an optical switching apparatus suitable for switching high-speed digital signals.

An apparatus adapted for effecting digital signal Cross Connection in a large-capacity telephone switching system is described in, for example, "Researches and Developments in Oki Electric", No. 138, (Vol. 55, No. 2), pp. 77–78. The structure of the prior art apparatus is schematically shown in FIG. 1. As seen in FIG. 1, time division switches (TSW) 1 and 3 are combined with a space division switch (SSW) 2 to constitute a Cross Connection for telephone signals and multiplexing apparatus of TST type having a large capacity. The time division switches (TSW) 1 and 3 include a plurality of semiconductor memory switches 10-1 to 10-N and 17-1 to 17-N respectively for effecting telephone cross connection by changing the order of writing and reading data in and from memories. The space division switch (SSW) 2 includes gate switches for effecting telephone cross connection by selecting input signals applied to input ports in every time slot. All of the time division switches (TSW) 1, 3 and the space division switch (SSW) 2 act to process serial digital input signals after converting them into parallel signals so as to decrease the operation speed of the individual memory switches. Therefore, interfaces between the time division switch (TSW) 1 and the space division switch (SSW) 2 and between the space division switch (SSW) 2 and the time division switch (TSW) 3 transmit the digital signals parallel form. Further, cables 4-1 to 4-N connecting the time division switch (TSW) 1 to the space division switch (SSW) 2 and cables 5-1 to 5-N connecting the space division switch (SSW) 2 to the time division switch (TSW) 3 are required by the number equal to the number of the parallel signals for each of the memory switches 10-1 to 10-N and 17-1 to 17-N. Thus, the prior art apparatus becomes complex in structure and large in scale.

In the prior art apparatus having a complex structure and a large scale as described above, phase matching between individual digital signals is required because serial digital input signals are converted into parallel signals for the purpose of decreasing the operation speed of the apparatus. Thus, the length of the signal transmission cables must be adjusted or buffer memories must be disposed at the signal receiving ends.

Also, when the number of serial-parallel converted signals is large or when the cross connection capacity is large, that is, when the number of the memory switches is large, a serious problem of wiring congestion inevitably arises. In particular, this problem appears at the space division switch (SSW) to which all the signals are concentrated.

SUMMARY OF THE INVENTION

With a view to obviate the prior art defects described above, it is an object of the present invention to provide an optical switching apparatus for high speed cross connection of digital signals and to also provide a method of interswitch optical transmission of digital signals.

In the apparatus of the present invention which attains the above object, light waves having respectively different wavelengths are used to transmit parallel signals, and optical switches capable of simultaneously processing light waves belonging to a wavelength range used for signal transmission are provided.

According to the present invention, which is based on the principle of wavelength division multiplex transmission, parallel signals being transmitted are not subjected to the prior art problem of increased deviation between their phases and are processed by the same optical switches in an optical space division switch (SSW), so that the parallel signals are free from the prior art problem of non-uniform signal delays between the parallel signal processing gates of the electrical space division switch (SSW). Therefore, the present invention facilitates signal phase adjustment even in the case of switching high-speed digital signals.

Futhermore, the prior art apparatus requires, for each of the semiconductor memory switches, that the number of cables and optical fibers be equal to the number of serial-parallel converted digital signals. In contrast, the present invention requires only a single cable or a single optical fiber for each of memory switches, thereby substantially eliminating the prior art problem of wiring congestion. This improvement is markedly exhibited at the space division switch.

DESCRIPTION OF THE PREFERRED EMBODIMENTS

Figure 1:
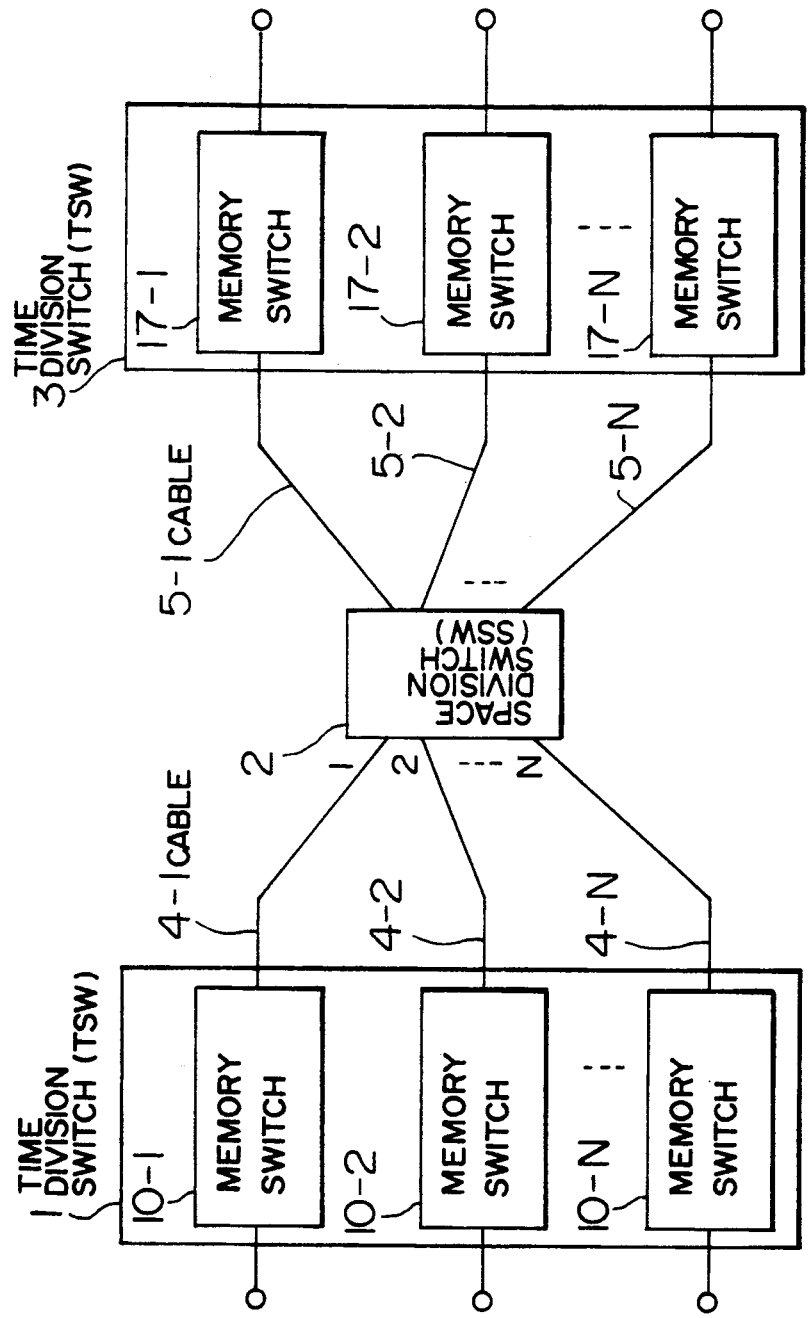
FIG. 1 is a block diagram showing schematically the structure of a prior art apparatus used for telephone cross-connection.
Figure 2:
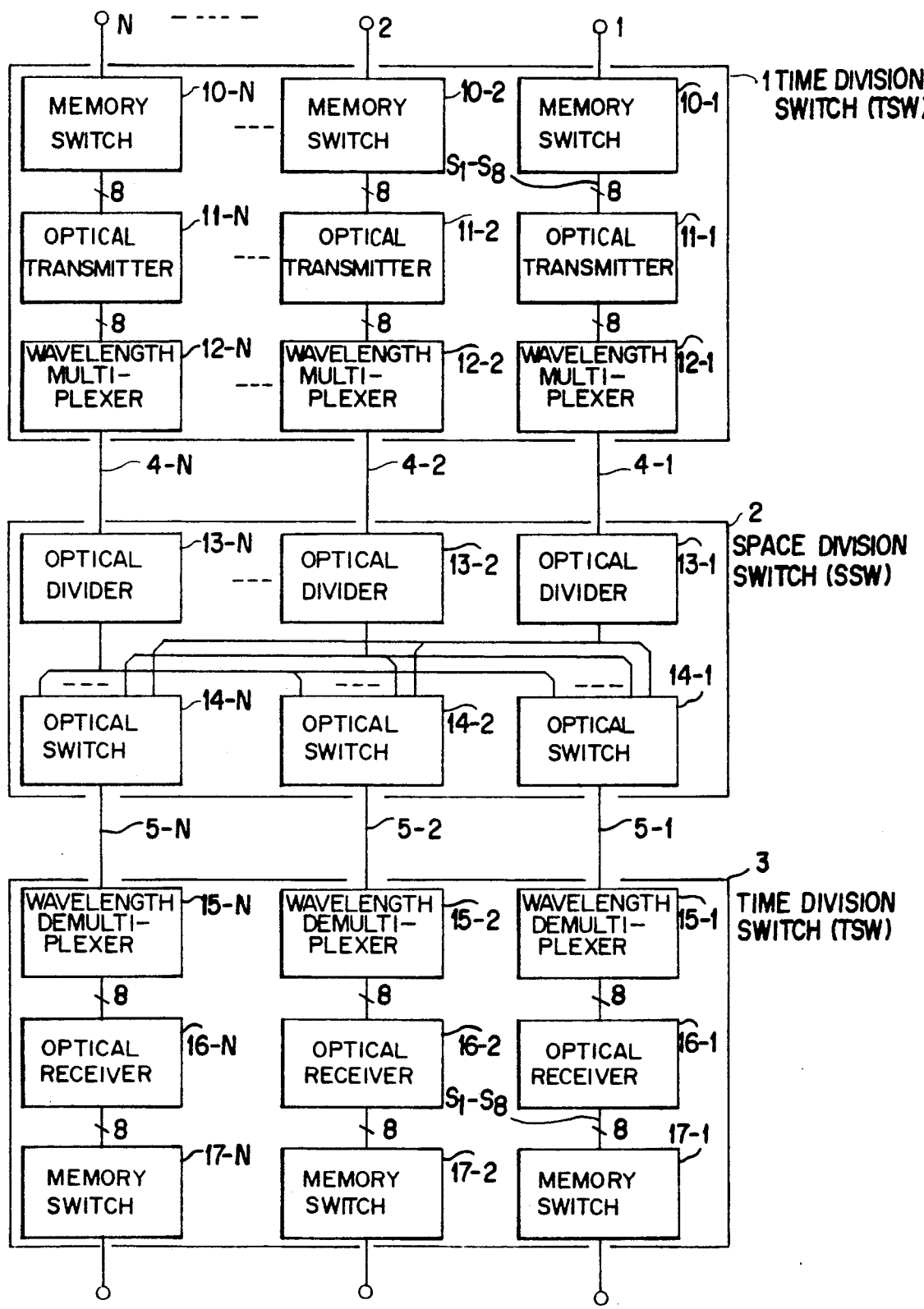
FIG. 2 is a block diagram showing schematically the structure of a preferred embodiment of the optical switching apparatus of large capacity used for telephone cross connection according to the present invention.

A preferred embodiment of the apparatus according to the present invention will now be described in detail with reference to FIG. 2. FIG. 2 is a block diagram of the embodiment of the optical switching apparatus in which two time division switches (TSW) 1 and 3 are combined with a single space division switch (SSW) 2 having N inputs and N outputs so as to effect telephone cross connection. The time division switches (TSW) 1 and 3 include semiconductor memory switches 10-1 to 10-N and 17-1 to 17-N which are similar to those shown in FIG. 1, respectively. In each of these time division switches (TSW) 1 and 3, serial digital signals applied as inputs are divided into 8 bits to be processed in parallel. In other words, 1-byte serial digital input signals are divided into 8 parallel signals, and such 8-bit parallel signals $S_1$ to $S_8$ are processed in parallel in a time division mode respectively. An optical transmitter 11 acting as an interface between the time division switch (TSW) 1 and the space division switch (SSW) 2 includes N optical transmitters 11-1 to 11-N, and each of these optical transmitters 11-1 to 11-N includes 8 laser diodes emitting laser beams having eight different wavelengths $\lambda_1$ to $\lambda_8$ corresponding to the parallel input signals $S_1$ to $S_8$ respectively. The wavelength interval between these wavelengths $\lambda_1$ to $\lambda_8$ is, for example, 10 nm. The wavelength $\lambda_1$ in all the optical transmitters 11-1 to 11-N are entirely the same. In other words, the wavelength $\lambda_4$ in, for example, the optical transmitter 11-2 is the same as the wavelength $\lambda_4$ in the optical transmitter 11-N. The time division switch (TSW) 1 includes wavelength multiplexers 12-1 to 12-N at its output end. These wavelength multiplexers 12-1 to 12-N are of a fiber bonded type and act so that the laser beams having the wavelengths $\lambda_1$ to $\lambda_8$ used for the transmission of the individual parallel signals can be applied as inputs to single optical fibers 4-1 to 4-N respectively. That is, the eight kinds of laser beams emitted from the eight laser diodes are mixed together in each of the wavelength multiplexers 12-1 to 12-N to emerge from a single optical output terminal of each of these wave mixers 12-1 to 12-N.

The space division switch (SSW) 2 includes N optical power dividers 13-1 to 13-N and N optical switches 14-1 to 14-N. Each of these optical power dividers 13-1 to 13-N acts to divide its single optical input into N portions and is, for example, in the form of a fiber star coupler. The branched portions of the optical input to each of the couplers 13-1 to 13-N are applied to each of the optical switches 14-1 to 14-N. Among the N optical inputs applied to each of the N optical switches 14-1 to 14-N, only one is selected, depending on a voltage applied to the control electrode of the specific optical switch. Therefore, the space division switch (SSW) 2 generates N optical outputs in response to the application of each of N optical inputs.

Figure 4:
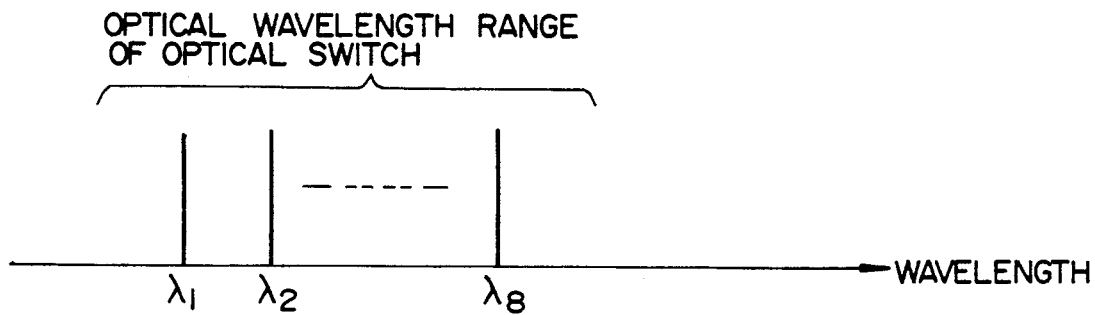
FIG. 4 is a graph showing the relation between the wavelength of light waves and the operation wavelength range of the optical switches used in the embodiment shown in FIG. 2.

Each of the optical switches 14-1 to 14-N exhibits the same switching characteristic for each of the wavelengths $\lambda_1$ to $\lambda_8$ of the laser beams emitted from the laser diodes incorporated in the interface, so that switching of all the wavelengths $\lambda_1$ to $\lambda_8$ can be effected at the same time. The optical switches 14-1 to 14-N employed in the illustrated embodiment are of a waveguide type made of Ti:LiNbO$_3$ and have an operation wavelength range of about 100 nm. FIG. 4 shows the relation between the wavelengths $\lambda_1$ to $\lambda_8$ and the operation wavelength range of the optical switches 14-1 to 14-N in the embodiment shown in FIG. 2. It will be seen in FIG. 4 that the lengths $\lambda_1$ to $\lambda_8$ lie within the operation wavelength range of the optical switches 14-1 to 14-N.

The optical output signals of the space division switch (SSW) 2 are applied by way of respective optical fibers 5-1 to 5-N to the time division switch (TSW) 3. In the time division switch (TSW) 3, the optical input signals are demultiplexed by wavelength demultiplexers 15-1 to 15-N into optical signals having the respective wavelengths $\lambda_1$ to $\lambda_8$, and these optical output signals of the wavelength demultiplexers 15-1 to 15-N are converted into corresponding electrical signals by optical receivers 16-1 to 16-N respectively. Filters using the acousto-optic effect are used as these wavelength demultiplexers 15-1 to 15-N in the illustrated embodiment. The wavelength demultiplexers 15-1 to 15-N are unnecessary when coherent modulation (FM or PM) is used for modulating the optical signals transmitted between the switches. In this case, the individual parallel signals are demodulated by suitably adjusting the wavelengths of local laser beams. The optical signals converted into the electrical signals again are then edited by the memory switches 17-1 to 17-N, and the resultant output signals appear from the time division switch (TSW) 3.

In the embodiment shown in FIG. 2 the number of the optical fibers connecting the time division switch (TSW) 1 to the space division switch (SSW) 2 is N (4-1 to 4-N) and is thus not dependent on the number of serial-parallel converted signals. Therefore, the illustrated embodiment is substantially free from the problem of wiring congestion. Also, because the number of optical fibers used in the present embodiment is small, and their weights are light, extra lengths of the optical fibers can be easily adjusted as desired. That is, the N optical fibers are used to connect the time division switch (TSW) 1 to the space division switch (SSW) 2, and it is a common practice that the length of the optical fibers is selected to be slightly larger than the distance between the TSW 1 and the SSW 2 so as to provide a sufficient margin in the length of the optical fibers. Because the number of optical fibers used in the apparatus of the present invention is significantly smaller than in the prior art apparatus, the present invention is advantageous in that a sufficient margin can be provided in the length of the optical fibers, and a large space such as that required hitherto is not required to provide such a margin. Further, because of low transmission loss of the optical fibers, no shortage of power will result even when the lengths of the individual optical fibers are extended to be equal to that of the longest optical fiber. Therefore, the optical fibers having an equal length can be used to connect the time division and space division switches. Further, because a single optical fiber transmits parallel signals having the respectively different wavelengths $\lambda_1$ to $\lambda_8$, the prior art problem of the increase of delay time deviation between signals during signal transmission does not occur, so that phase matching between the signals is facilitated. Further, because all wavelength-division multiplexed optical signals are simultaneously switched by the single optical gate in each of the optical switches 14-1 to 14-N, the present invention eliminates the prior art problem of deviation in signal delays attributable to switching of serial-parallel converted signals by separate gates.

Further, the apparatus can be small in size since the optical transmission modules at the input and output of the space division switch (SSW) 2 in the prior art apparatus are now unnecessary.

In the embodiment described above, the optical switches 14-1 to 14-N incorporated in the space division switch (SSW) 2 are of the type which has N inputs and one output. It is apparent, however, that the optical switches 14-1 to 14-N may be of the type which has N ports for input and output, respectively. In this modification, the optical power dividers 13-1 to 13-N are unnecessary. Further, when so required, optical amplifiers may be used preceding and succeeding the space division switch (SSW) 2.

Figure 6:
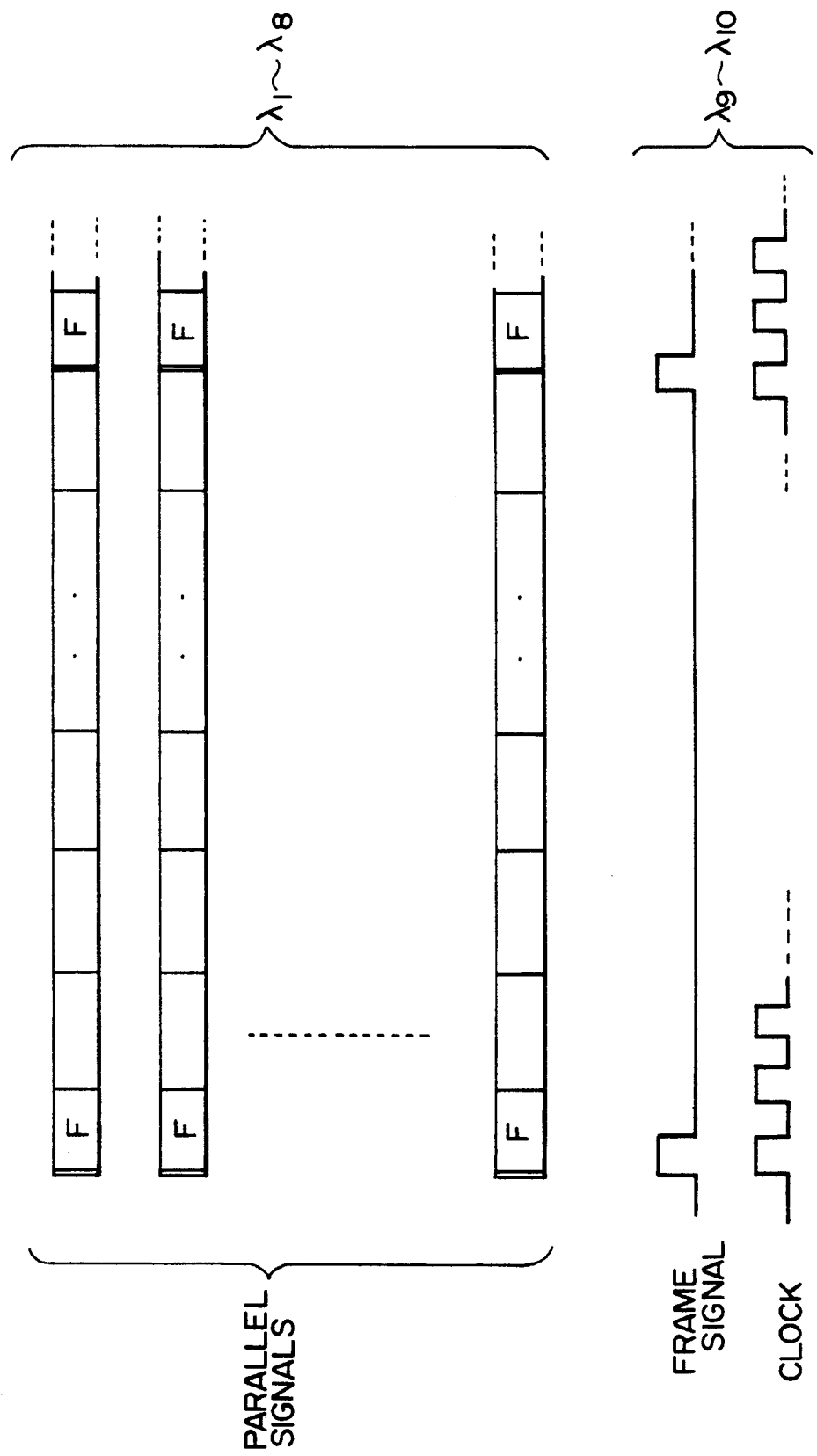
FIG. 6 is a time chart showing the relation between parallel signals having wavelengths $\lambda_1$ to $\lambda_8$ and a frame signal and a clock signal transmitted through the same paths as those of the parallel signals.

FIG. 6 is a graph showing a frame identifying 15 signal and a clock signal, with wavelengths of $\lambda_9$ and $\lambda_{10}$, transmitted through the same paths as those of the parallel signals having the wavelengths $\lambda_1$ to $\lambda_8$. Each of the parallel signals $\lambda_1$ to $\lambda_8$ includes the frame code F at its head and a plurality of succeeding data. The clock signal is transmitted together with each of such parallel signals through the same path.

Another embodiment of the present invention will now be described with reference to FIG. 3. In the second embodiment, the apparatus includes a normal (live) system and an emergency (stand-by) system, and includes easy change-over between the two systems by using a different set of wavelengths for interfaces of the normal and the emergency systems.

Figure 3:
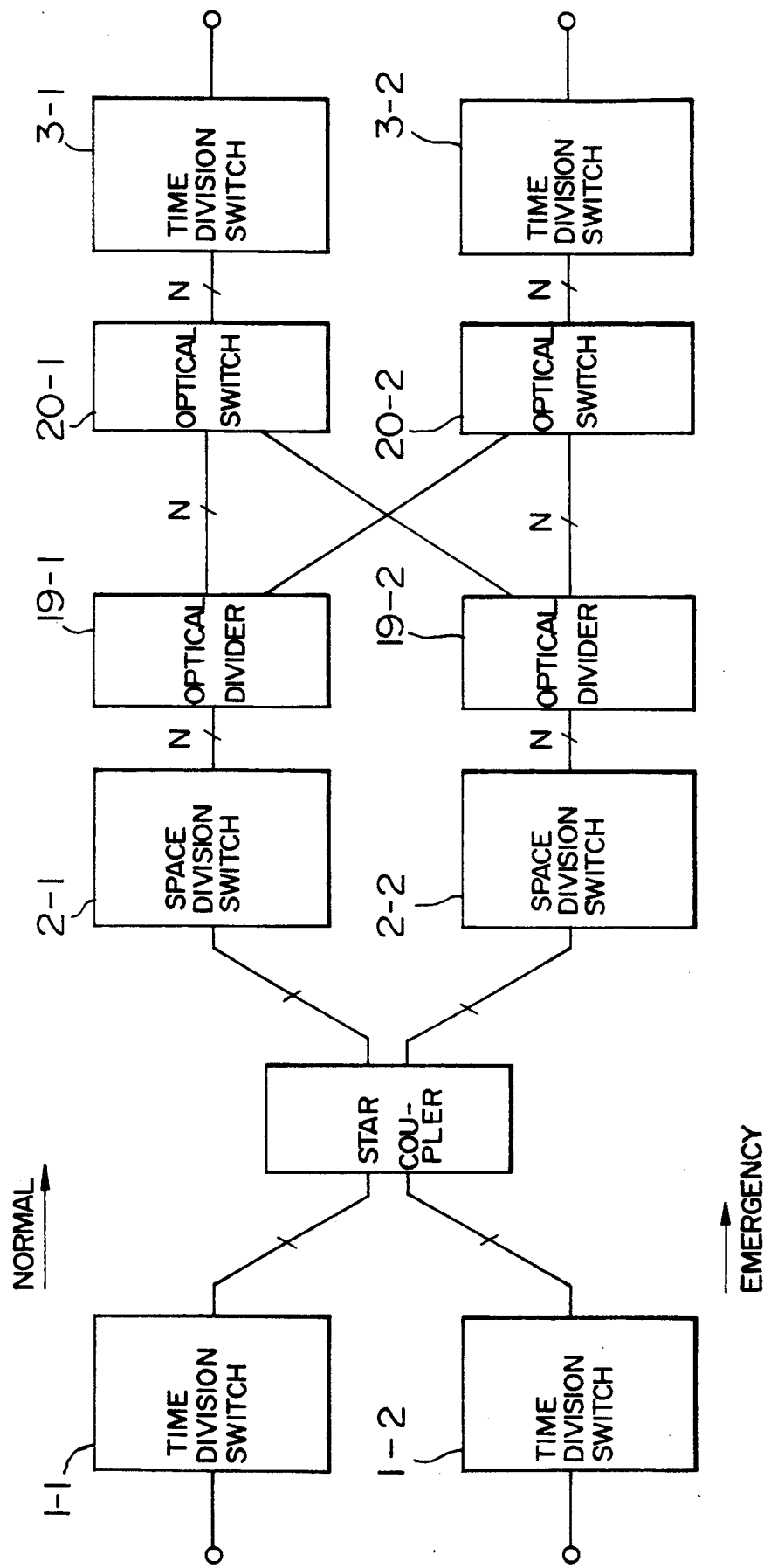
FIG. 3 is a block diagram showing schematically the structure of another preferred embodiment of the optical switching apparatus of the present invention including both a normal system and an emergency system.

Referring to FIG. 3, time division switches (TSW) 1-1 and 3-1 in the live system and time division switches (TSW) 1-2 and 3-2 in the stand-by system are similar to those described with reference to FIG. 2. Likewise, a space division switch (SSW) 2-1 in the live system and a space division switch (SSW) 2-2 in the stand-by system are also similar to those described with reference to FIG. 2.

Figure 5A:
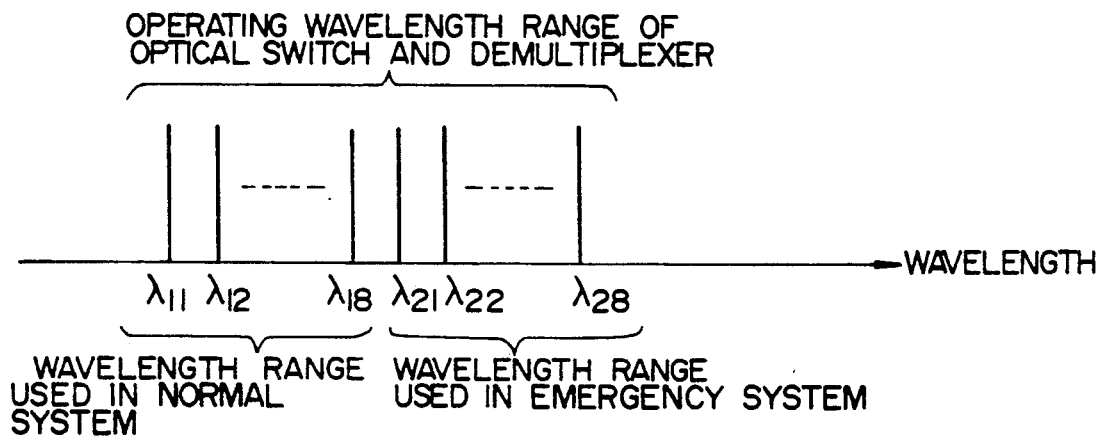
FIGS. 5A and 5B are graphs each showing the relation between the wavelength of light waves and the operation wavelength range of the optical switches and wavelength filter used in the embodiment shown in FIG. 3.
Figure 5B:
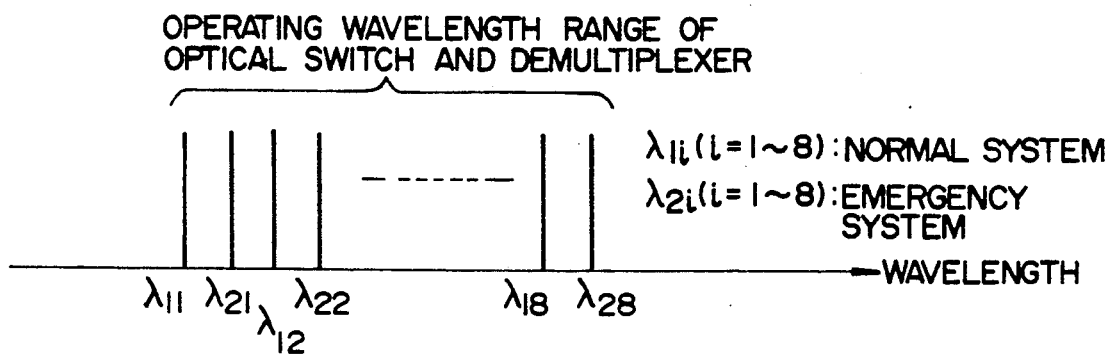

FIGS. 5A and 5B show two examples of the relation between wavelengths used for signal transmission in the live and stand-by time division switches (TSW) 1-1, 1-2 and operating wavelength ranges for both of the optical switches in the space division switches 2-1, 2-2 and of the wavelength filters in the time division switches 3-1, 3-2. Optical signals transmitted from the optical transmitters connected to the semiconductor memory switches in the live and stand-by time division switches (TSW) 1-1 and 1-2 are applied, after multiplexing and branching, to the live and stand-by space division switches (SSW) 2-1 and 2-2. For the purpose of branching, there is an optical star coupler 18, that consists of N fused fiber type star couplers, each having 2 ports for input and output, respectively. The space division switches (SSW) 2-1 and 2-2 simultaneously switch these 2 sets of optical input signals. The output signals of the live and stand-by space division switches (SSW) 2-1 and 2-2 are distributed by optical power dividers 19-1 and 19-2 to the live and stand-by time division switches (TSW) 3-1 and 3-2. Each of these optical power dividers 19-1 and 19-2 are also in the form of the fiber star coupler. Optical switches 20-1 and 21-1 are disposed on the input sides of the respective time division switches (TSW) 3-1 and 3-2 so as to select the optical signals transmitted from either the live space division switch (SSW) 2-1 or the stand-by space division switch (SSW) 2-2. The live and stand-by time division switches (TSW) 3-1 and 3-2 include wavelength filters similar to those included in the time division switch (TSW) 3 shown in FIG. 2. By the function of the wavelength filters in the live and stand-by time division switches (TSW) 3-1 and 3-2, the optical signals having the wavelength range of $\lambda_{11}$ to $\lambda_{18}$ and those having the wavelength range of $\lambda_{21}$ to $\lambda_{28}$, as shown in FIGS. 5A and 5B, can be selected. That is, the optical signals applied from the live or stand-by time division switch (TSW) 1-1 or 1-2 can be selected.

The process of change-over between the live system and the stand-by system in the second embodiment will now be described. In this second embodiment, optical signals coming from the live and stand-by time division switches (TSW) 1-1 and 1-2 and transmitted through the live and stand-by space division switches (SSW) 2-1 and 2-2 are applied to the inputs of the optical switches 20-1 and 20-2. Therefore, for the purpose of change-over of the optical signals appearing from the live time division switch (TSW) 1-1 or stand-by time division switch (TSW) 1-2, the normal (live) time division switch (TSW) 3-1 and the emergency (stand-by) time division switch (TSW) 3-2 change over the live wavelength range of $\lambda_{11}$ to $\lambda_{18}$ to the stand-by wavelength range of $\lambda_{21}$ to $\lambda_{28}$ or vice versa by the function of the wavelength filters in the live and stand-by time division switch (TSW) 3-1 or 3-2, without changing the state of the optical switches 20-1 and 20-2. On the other hand, when the change-over between the live space division switch (SSW) 2-1 and the stand-by space division switch (SSW) 2-2 is desired, the apparatus is to be controlled so that the live and stand-by optical switch 20-1 and 20-2 select optical signals from the normally operating one of the live and stand-by space division switches (SSW) 2-1 and 2-2.

Reliability and operatability of the apparatus can be improved in the second embodiment, because most of the parts (the optical star couplers 18 and the optical power dividers 19 shown in FIG. 3) required for the system change-over can be provided by passive elements, and the all of the system change-over process can be achieved on the side of the time division switches (TSW) 3-1 and 3-2.

In each of the aforementioned two embodiments shown in FIGS. 2 and 3, received serial electrical signals are converted into time-division multiplexed optical signals in the time division switch (TSW) 1, and, after the cross connection in TSW1, SSW2 and TSW3 the optical signals are converted again into electrical signals and outputted.

Alternatively, received serial optical signals may be subjected to cross connection, and such edited optical signals may be generated intact without being converted into electrical signals. In this case, the memory switches 10-1 to 10-N and 17-1 to 17-N are replaced by optical memory elements, and the optical transmitters 11-1 to 11-N as well as the optical receivers 16-1 to 16-N are naturally unnecessary. Also input signals could be parallel optical signals.

It will be understood from the foregoing detailed description of the present invention that the phase difference between parallel signals can be minimized thereby facilitating processing of high-speed digital signals, and the number of required wiring connections can be decreased thereby substantially eliminating the problem of wiring congestion.

We claim:

1. An optical switching apparatus including at least a first and a second time division switch group for switching electrical signals in time division mode and a space division switch means having a plurality of input ports and at least one output port for switchable cross connection of optical signals between said input ports and said output ports in space division mode, said apparatus comprising a plurality of switches included in said first time division switch group for generating bit serial-bit parallel converted electrical signals, means for transmitting the serial-parallel converted electrical signals with wavelength division multiplexed optical transmission using light waves having wavelengths corresponding to the respective bits within said parallel signals, a plurality of optical switches included with said space division switch means for switching the wavelength-division multiplexed optical signals, and means for demultiplexing the wavelengths of the light waves used for the interswitch transmission of the optical signals.

2. An optical switching apparatus according to claim 1, wherein said bit parallel signals transmitted from the plural switches in said first time division switch group to said space division switch means, each have the same wavelengths allotted to their corresponding bits.

3. An optical switching apparatus according to claim 1 or 2, wherein said optical switches do not demultiplex the wavelength-division multiplexed optical signals according to their wavelengths but simultaneously switch all the optical signals.

4. An optical switching apparatus according to claim 1 or 2, wherein the wavelength-division multiplexed optical signals are demultiplexed, and said optical switches simultaneously switch said signals according to their wavelengths or groups of a plurality of wavelengths.

5. An optical switching apparatus according to claim 1 or 2, wherein said first time division switch group is divided into a live system and a stand-by system, and light waves having different wavelengths depending on the live or stand-by system are used for signal transmission to said space division switch means.

6. An optical switching apparatus according to claim 5, further comprising means for demultiplexing the wavelength of the light waves in a selected wavelength range among those used for signal transmission between the live and stand-by systems of said first time division switch group and those of said space division switch means.

7. An optical switching apparatus according to claim 1, wherein said optical wavelength demultiplexing means is an acousto-optic element.

8. An optical switching apparatus according to claim 5, further comprising means provided in said second time division switch groups for selecting the optical outputs from said optical switches divided into the live and stand-by systems.

9. An optical switching apparatus according to claim 1, further comprising an optical amplifier disposed at least on the input or output side of each of said optical switches.

10. An optical switching apparatus according to claim 1, wherein each of said optical switches has N input ports and one output port and is associated with optical power dividing means.

11. An optical switching apparatus according to claim 1, wherein each of said optical switches has N ports for input and output respectively.

12. An optical switching apparatus according to claim 1, wherein each of said optical switches is of a waveguide type.

13. An optical switching apparatus according to claim 5, further comprising means for multiplexing the light waves used for signal transmission between the live and stand-by systems of said first time division switch group and those of said space division switch group, and means for dividing and distributing the multiplexed light waves to said optical switches divided also into a live system and a stand-by system.

14. An optical switching apparatus according to claim 13, further comprising means for demultiplexing the wavelength of the light waves in a selected wavelength range among those used for signal transmission between the live and stand-by systems of said first time division switch group and those of said space division switch group.

15. An optical switching apparatus including at lest a first and a second time division switch group for switching optical signals in time division mode and a space division switch means having a plurality of input ports and at least one output port for switchable cross connection of optical signals in a space division mode, thereby effecting cross connection of digital signals, said apparatus comprising a plurality of switches included in said first time division switch group for generating bit serial-bit parallel converted electrical signals, means for transmitting the serial-parallel converted optical signals with wavelength division multiplexed optical transmission using light waves having wavelengths corresponding to the respective bits within said parallel signals, a plurality of optical switches included with said space division switch means for switching the wavelength-division multiplexed optical signals, and means for demultiplexing the optical signals according to the wavelength of the light waves used for the inter-switch transmission of the optical signals.

16. An optical switching apparatus according to claim 15, wherein said bit parallel signals transmitted from the plural switches in said first time division switch group to said space division switch means, each have the same wavelengths allotted to their corresponding bits.

17. An optical switching apparatus according to claim 15 or 16, wherein said optical switches do not demultiplex the wavelength-division multiplexed optical signals according to their wavelengths but simultaneously switch all the optical signals.

18. An optical switching apparatus according to claim 15 or 16, wherein said first time division switch group is divided into a live system and a stand-by system, and light waves having different wavelengths depending on the live or stand-by system are used for signal transmission to said space division switch means.

19. An optical switching apparatus according to claim 18, further comprising means for multiplexing the light waves used for signal transmission between the live and stand-by systems of said first time division switch group and those of said space division switch means, and means for dividing and distributing the multiplexed light waves to said optical switches divided also into a live system and a stand-by system.

20. An optical switching apparatus according to claim 18, further comprising means for demultiplexing the light waves of a selected wavelength range among those used for signal transmission between the live and stand-by systems of said first time division switch group and those of said space division switch means.

21. An optical switching apparatus according to claim 15 or 16, wherein the wavelength-division multiplexed optical signals are demultiplexed, and said optical switches simultaneously switch said signals according to their wavelengths or groups of a plurality of wavelengths.

22. An optical switching apparatus according to claim 19, further comprising means for demultiplexing the light waves of a selected wavelength range among those used for signal transmission between the live and stand-by systems of said first time division switch group and those of said space division switch means.

* * * * *